(12) United States Patent
Bucheru

(10) Patent No.: US 11,863,084 B2
(45) Date of Patent: Jan. 2, 2024

(54) MULTIPLEX CONTROL FOR MULTI-PORT AC/DC ADAPTER WITH CHOPPER

(71) Applicant: Apple Inc., Cupertino, CA (US)

(72) Inventor: Bogdan T. Bucheru, Lakeway, TX (US)

(73) Assignee: Apple Inc., Cupertino, CA (US)

(*) Notice: Subject to any disclaimer, the term of this patent is extended or adjusted under 35 U.S.C. 154(b) by 145 days.

(21) Appl. No.: 17/448,439

(22) Filed: Sep. 22, 2021

(65) Prior Publication Data
US 2023/0107411 A1    Apr. 6, 2023

(51) Int. Cl.
*H02M 7/06* (2006.01)

(52) U.S. Cl.
CPC ................................. *H02M 7/06* (2013.01)

(58) Field of Classification Search
CPC .. H02M 1/0025; H02M 1/0067; H02M 1/007; H02M 1/008; H02M 3/335; H02M 3/33569; H02M 3/33576; H02M 7/06
See application file for complete search history.

(56) References Cited

U.S. PATENT DOCUMENTS

| | | | | |
|---|---|---|---|---|
| 7,274,175 | B2* | 9/2007 | Manolescu | H02M 7/217 323/267 |
| 7,518,263 | B2* | 4/2009 | Gan | H02M 3/33561 323/267 |
| 7,821,239 | B2* | 10/2010 | Hosotani | H02M 3/33561 323/267 |
| 2006/0220495 | A1* | 10/2006 | Yamaguchi | H02M 3/156 310/318 |
| 2006/0226130 | A1* | 10/2006 | Kooken | H02M 1/4225 219/130.1 |
| 2021/0223838 | A1* | 7/2021 | Yeh | H02M 3/33523 |

* cited by examiner

*Primary Examiner* — Gary L Laxton
(74) *Attorney, Agent, or Firm* — FLETCHER YODER PC

(57) ABSTRACT

A multi-output AC/DC adapter can include a main power stage that receives power from an AC power source and delivers an intermediate output voltage, a plurality of regulator stages each comprising a chopper circuit that receives the intermediate output voltage and produces a regulated output DC voltage for one of the multiple outputs, and a controller. The main power stage can be a flyback converter, and the intermediate output voltage can be derived from a secondary winding of a flyback transformer of the flyback converter. The controller can provide a voltage reference signal and a feedback signal to the feedback loop of the main power stage, and the feedback signal can be an output voltage of one of the regulator stages. The controller can also provide a voltage reference signal to the controller of each of the regulator stages.

16 Claims, 7 Drawing Sheets

MULTIPLEX CONTROL FOR MULTI-PORT AC/DC ADAPTER WITH CHOPPER

BACKGROUND

As battery-powered personal electronic devices such as notebook computers, smartphones, tablet computers, etc. and their accessories, such as wireless earphones, styluses, and the like have proliferated, users have increasingly needed to power and/or recharge multiple devices simultaneously. In some cases only a limited number of AC wall outlets may be available for such use. Thus, it may be desirable to provide AC adapters with multiple DC power outputs for powering and recharging multiple devices. Disclosed herein are various arrangements of such adapters.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A multi-output AC/DC adapter can include a main power stage configured to receive power from an AC power source and deliver an intermediate output voltage, a plurality of regulator stages, each regulator stage comprising a chopper circuit that receives the intermediate output voltage from the main power stage and produces a regulated output DC voltage for one of the multiple outputs of the AC/DC adapter, and a controller coupled to the main power stage and each of the plurality of regulator stages. The main power stage can be a flyback converter, and the intermediate output voltage can be derived from a secondary winding of a flyback transformer of the flyback converter. Each chopper circuit can include a diode coupled to the intermediate output voltage of the main power stage, a chopper switch, and a chopper controller. Each chopper circuit can further include a power delivery switch operable to selectively disconnect a corresponding output. The controller can provide a voltage reference signal to the feedback loop of the main power stage. The controller can also provide a feedback signal to the feedback loop of the main power stage. The feedback signal provided to the feedback loop of the main power stage can be an output voltage of one of the regulator stages. The controller can also provide a voltage reference signal to the controller of each of the regulator stages. The controller can be configured to negotiate a power delivery contract with one or more devices coupled to the multiple outputs of the AC/DC adapter.

A controller for a multi-output AC/DC adapter can include logic circuitry that negotiates a power delivery contract with one or more devices coupled to the multiple outputs of the AC/DC adapter, logic circuitry that determines a highest voltage from the negotiated power delivery contracts, circuitry that provides a reference voltage corresponding to the highest voltage from the negotiated power delivery contracts to a feedback circuit of the main power stage, and circuitry that provides a feedback voltage to the feedback circuit of the main power stage. The feedback voltage can be an output of the chopper stage corresponding to the highest voltage from the negotiated power delivery contracts. The power delivery can be are negotiated in accordance with a Universal Serial Bus Power Delivery (USB-PD) standard. The logic circuitry that negotiates a power delivery contract with one or more devices coupled to the multiple outputs of the AC/DC adapter can include a programmable controller. The logic circuitry that determines a highest voltage from the negotiated power delivery contracts can include a programmable controller. The circuitry that provides a feedback voltage to the feedback circuit of the main power stage can include a switching device corresponding to each chopper stage that couples the output of the chopper stage corresponding to the highest voltage from the negotiated power delivery contracts. The controller can further include chopper control circuitry for each chopper stage. The controller can further include a feedback loop and control circuitry for the main power stage.

A method of controlling a multi-output AC/DC adapter can include determining an output voltage of each of the multiple outputs of the adapter, regulating the main power stage to produce a voltage corresponding to a highest output voltage of the determined output voltages, and regulating each chopper stage to produce an output voltage corresponding to a respective output. Regulating the main converter to produce a voltage corresponding to the highest output voltage of the determined output voltages can further include providing a reference voltage to the main power stage that corresponds to the highest output voltage and providing a feedback voltage to the main power stage that is an output voltage of the chopper stage or stages having the highest output voltage. Regulating each chopper stage to produce an output voltage corresponding to a respective output can include providing a reference signal to a chopper controller of each chopper stage that corresponds to the output voltage of such stage. Determining an output voltage of each of the multiple outputs of the adapter can include negotiating a power delivery contract with a load coupled to each respective output.

DETAILED DESCRIPTION

Figure 1A:
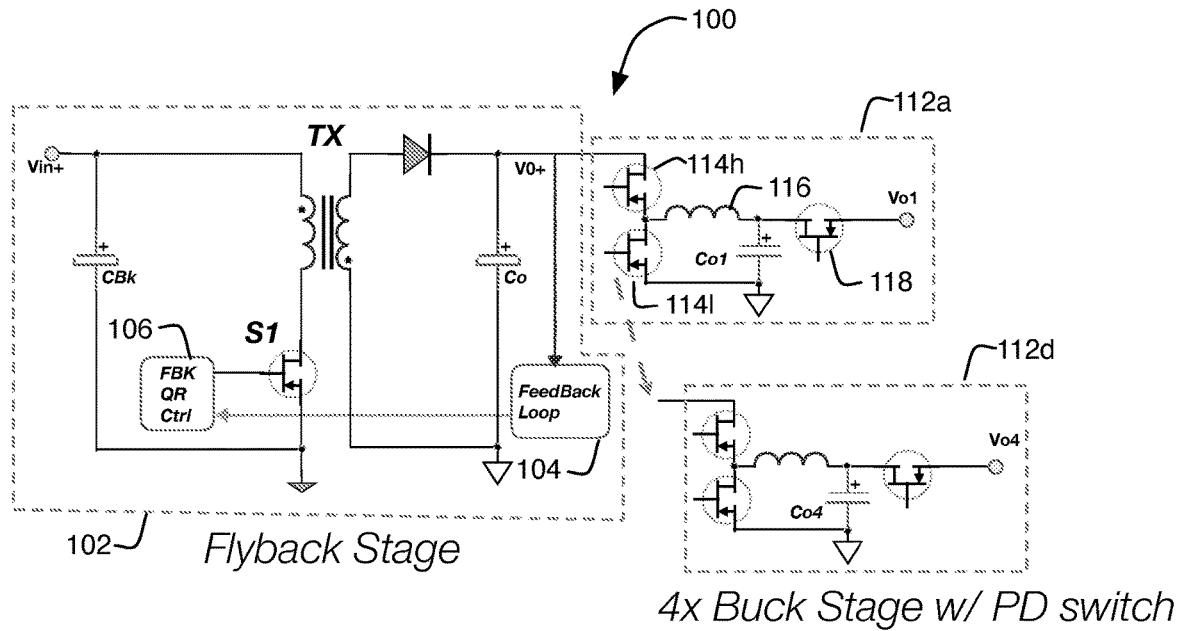
FIG. 1A illustrates a conventional multi-output adapter.

One or more specific embodiments are described below. To provide a concise description of these embodiments, not all features of an actual implementation may be described in the specification. In the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In the following description, for purposes of explanation, various details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Figure 7:
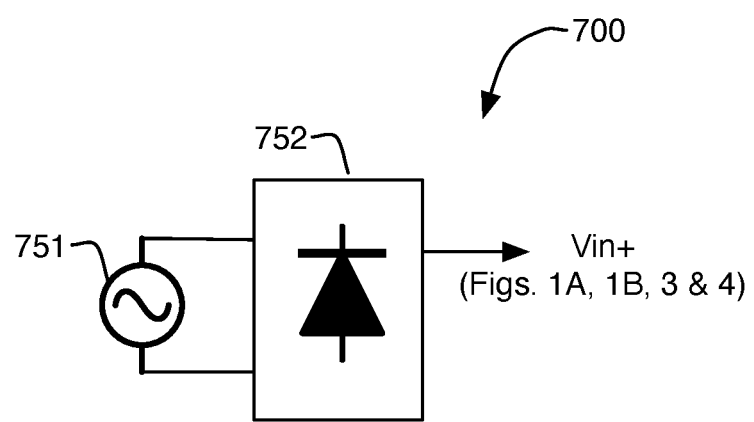
FIG. 7 illustrates a rectifier circuit.

FIG. 1A illustrates an exemplary prior art multi-output AC/DC adapter 100. Adapter 100 includes a main power stage 102, which, in the illustrated example is a flyback converter but, in other embodiments or applications could be any suitable converter topology. Power stage 102 receives an input voltage Vin+, which may, for example, be received from an AC input 751 (FIG. 7) connected via a rectifier 752 (FIG. 7). An input capacitor CBk may serve smooth the rectified AC voltage. In the illustrated flyback converter configuration, a main switch S1 may be switched by feedback loop 104 and controller 106 to alternately store energy in flyback transformer TX (when switch S1 is closed) and discharge stored energy to the flyback stage output (voltage V0+) through the rectifier diode. Main switch S1 may be a silicon, silicon carbide, or gallium nitride MOSFET, or any other suitable semiconductor switching device appropriate to the particular application. Output filter capacitor Co may serve to filter the output voltage, so as to reduce ripple seen by the loads on main power stage 102. Feedback loop 104 compares the output voltage V0+ to a suitable reference and provides control signals to main switch S1 via controller 106 to regulate the output voltage V0+ to a desired level. Operation of flyback converters (or other suitable topologies for main power stage 102) is known to those skilled in the art, and, for sake of brevity will not be repeated here. However, any of a variety of flyback converter configurations, including primary resonant flyback converters, active clamp flyback converters, etc. could be used as appropriate for a given embodiment or application.

Adapter 100 also includes a plurality of regulator stages 112a-112d, one for each output. For conciseness only stages 112a and 112d are illustrated, but additional stages 112b and 112c are implied and may be substantially similar to the illustrated stages. Also, more or fewer regulator stages could be provided depending on the number of DC outputs desired. Each regulator stage 112a-112d includes a converter that regulates the output voltage V0+ from main power stage 102 to the level required for each output, i.e., Vo1-Vo4. In the illustrated example, each regulator stage 112a-112d is a buck converter including a high side switch 114h, a low side switch 114l, an output filter capacitor Co1, and a power deliver switch 118 (discussed in greater detail below). Switches 114h and 114l may be silicon, silicon carbide, or gallium nitride MOSFETs, or any other suitable semiconductor switching device appropriate to the particular application. Thus, main power stage 102 may be configured to produce a regulated output voltage V0+ that is greater than or equal to the largest output voltage Vo1-Vo4 required by a respective device to be connected to such outputs. In other embodiments, one or more of regulator stages 112a-112d could be another converter topology, such as a boost converter or buck-boost converter, in which case the regulated output voltage of main power stage 102 could be less than a required output voltage. In any case, operation of such regulator stages is known to those skilled in the art and, for sake of brevity, will not be repeated here.

Figure 1B:
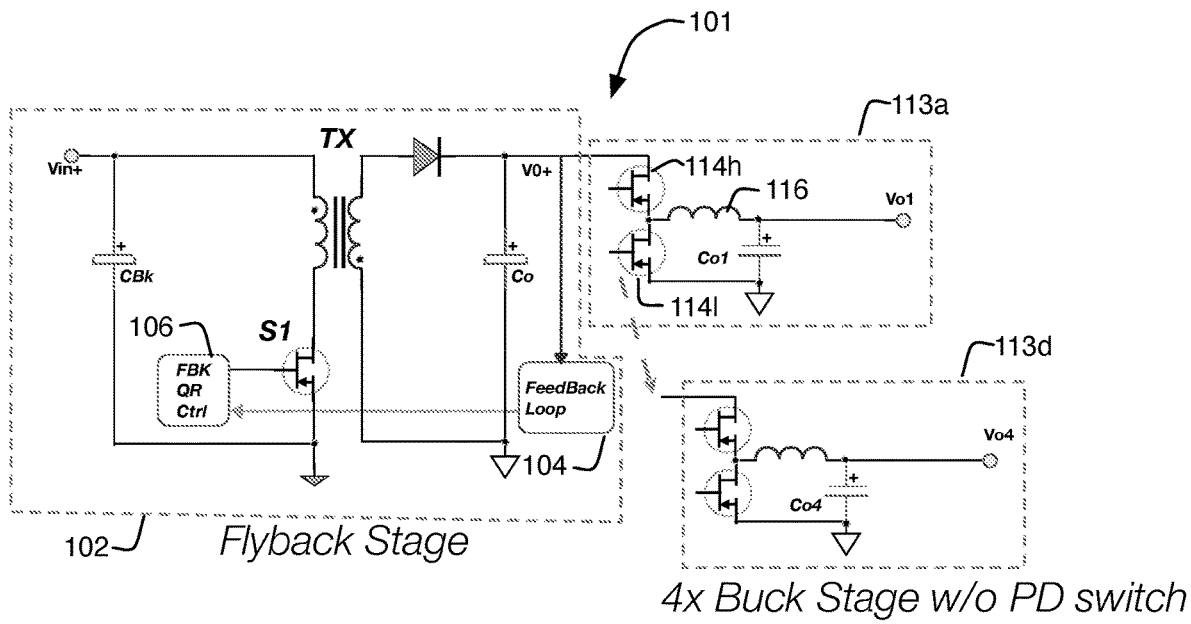
FIG. 1B illustrates an alternative conventional multi-output adapter.

In some embodiments, adapter 100 may implement the Universal Serial Bus Power Delivery ("USB-PD") standard, such that a device connected to any one of outputs Vo1-Vo4 may negotiate a suitable output voltage, e.g., 5V, 9V, 15V, 20V, etc. Additionally, adapter 100 may include, in the respective regulator stages 112a-112d, power delivery switches 118. Power delivery switches 118 may be silicon, silicon carbide, or gallium nitride MOSFETs, or any other suitable semiconductor switching devices appropriate to the particular application. These switches may be used to selectively disconnect/disable a respective output stage when its operation is not required or in the event of a fault (such as a short circuit failure of high side switch 114h that would otherwise permanently connect output Vo1 to main power stage 102's output voltage). However, these power delivery switches 118 may be omitted, as illustrated in converter 101 of FIG. 1B, which is substantially similar to converter 100, except that regulator stages 113a-113d omit power delivery switches 118.

The two exemplary adapters 100 and 101 may suffer from various disadvantages depending on the power requirements of the respective loads connected to outputs Vo1-Vo4 and/or the total power requirement. First, in adapter 100, three additional switching devices 114h, 114l, and 118 are required per additional output, together with an additional magnetic element 116. The same applies to adapter 101, although only two additional switches (114h, 114l) per output are required. If each output is intended to provide the full output power of the adapter, then each of these switches will be relatively large, and expensive. Otherwise, if only certain outputs are intended to carry the full rated power, then the user must know which output to use when full power is required and attach devices accordingly. Neither situation may be optimal.

Figure 2:
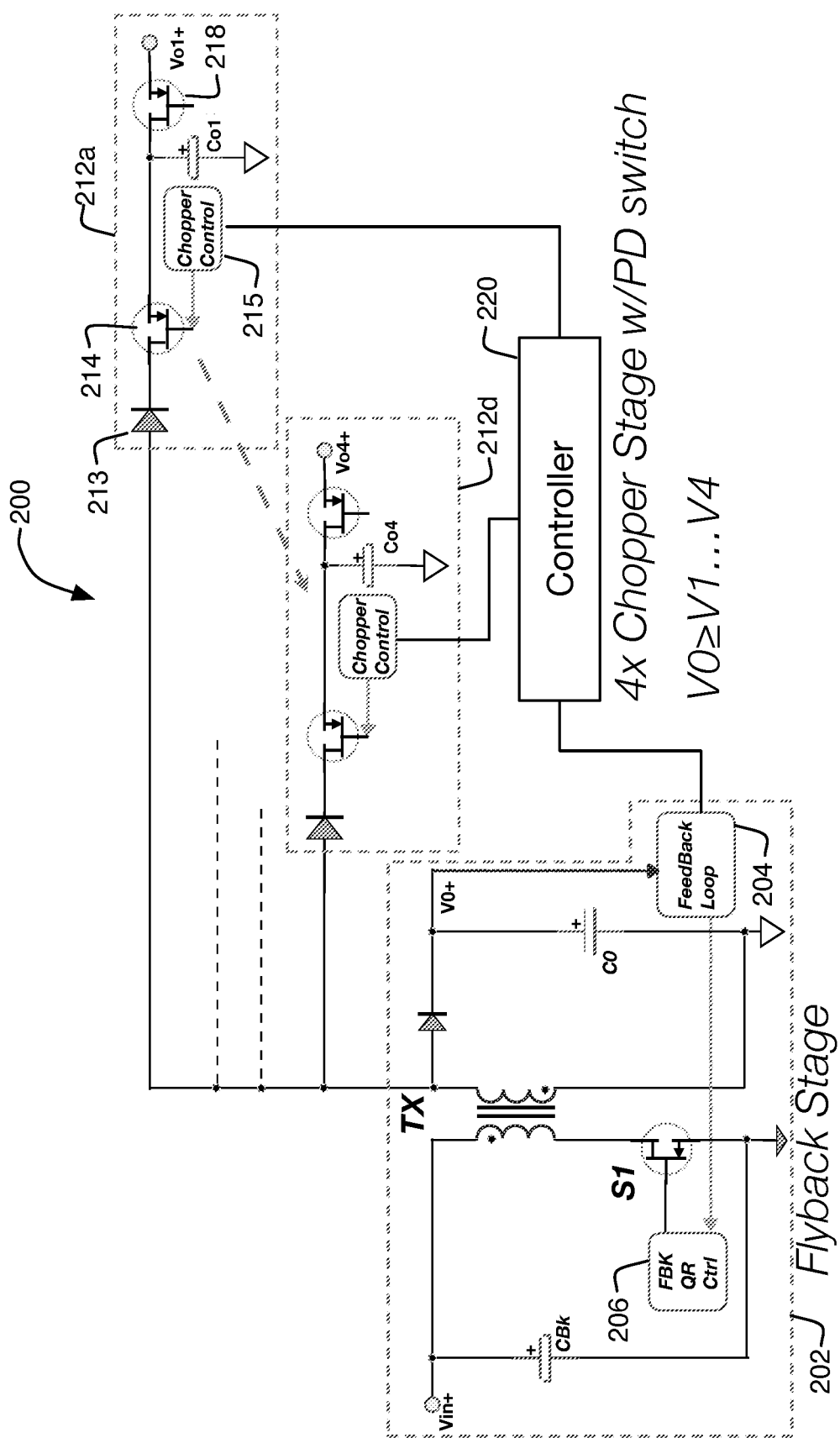
FIG. 2 illustrates a multi-output adapter with a single power stage and chopper regulators for each output.

FIG. 2 illustrates an exemplary multi-output AC/DC adapter 200 that can address these issues. Adapter 200 includes a main power stage 202, which, in the illustrated example is a flyback converter but, in other embodiments or applications could be any suitable converter topology. Main power stage 202 receives an input voltage Vin+, which may, for example, be received from an AC input 701 (FIG. 7) connected via a rectifier 702 (FIG. 7). An input capacitor CBk may serve smooth the rectified AC voltage. In the illustrated flyback converter configuration, a main switch S1 may be switched by feedback loop 204 and controller 206 to alternately store energy in flyback transformer TX (when switch S1 is closed) and discharge stored energy to the flyback stage output (voltage V0+) through the rectifier diode. Main switch S1 may be a silicon, silicon carbide, or gallium nitride MOSFET, or any other suitable semiconductor switching device appropriate to the particular application. Output filter capacitor Co may serve to filter the output voltage, so as to reduce ripple seen by the loads on main power stage 202. Feedback loop 204 compares the output voltage V0+ to a suitable reference and provides control signals to main switch S1 via controller 206 to regulate the output voltage V0+ to a desired level. Operation of flyback converters (or other suitable topologies for main power stage 202) is known to those skilled in the art, and, for sake of brevity will not be repeated here. However, any of a variety of flyback converter configurations, including primary resonant flyback converters, active clamp flyback converters, etc. could be used as appropriate for a given embodiment or application.

Adapter 200 also includes a plurality of regulator stages 212a-212d, one for each output. For conciseness only stages 212a and 212d are illustrated, but additional stages 212b and 212c are implied and may be substantially similar to the illustrated stages. Also, more or fewer regulator stages could be provided depending on the number of DC outputs desired. Each regulator stage 212a-212d includes a chopper circuit that regulates the intermediate output voltage derived from the secondary winding of flyback transformer TX to the level required for each output, i.e., Vo1-Vo4. In the illustrated example, each regulator stage 212a-212d is a chopper circuit including a rectifier diode 213, a chopper switch 214, a chopper controller 215, an output filter capacitor Co1, and a power delivery switch 218. Chopper switch 214 and power delivery switch 218 may be silicon, silicon carbide, or gallium nitride MOSFETs, or any other suitable semiconductor switching device appropriate to the particular application. Thus, main power stage 202 may be configured to produce a regulated output voltage V0+ that is greater than or equal to the largest output voltage Vo1-Vo4 required by a respective device to be connected to such outputs.

Each regulator stage (e.g., chopper stage 212a) includes a rectifier diode 213 that serves as "gatekeeper" to the stage. That is, the diode prevents back-feeding the main power stage 202's output from the respective outputs of the adapter. Additionally, each chopper stage may include a corresponding chopper controller 215. This controller may operate chopper switch 214 with a duty cycle selected to ensure that the corresponding output voltage Vo1+ is regulated to an appropriate value. For example, chopper controller 215 can compare the output voltage Vo1+ to a suitable reference voltage, with the difference between the two (the error signal) being compared to a ramp signal to generate a PWM switching signal applied to the gate of chopper switch 214. For the example USB-PD applications, low voltage switching devices (e.g., 30V rated) may be used for chopper switches 214.

Additionally, adapter 200 may implement the USB-PD standard, such that a device connected to any one of outputs Vo1-Vo4 may negotiate a suitable output voltage, e.g., 5V, 9V, 15V, 20V, etc. To that end, each chopper controller 215 may be connected to a controller 220. Controller 220 may be implemented using any suitable combination of analog circuitry, digital circuitry, and/or programmable controllers or processors configured to operate as further described herein. Such circuitry may be implemented as any combination of discrete circuitry, integrated circuits, application specific integrated circuits (ASICs), field programmable gate arrays (FPGAs), and the like. Controller 220 may then serve to: (1) negotiate a USB-PD contract (including, e.g., output voltage, current, and power requirements) with the respective devices connected to DC outputs Vo1+-Vo4+; (2) configure feedback loop 204 to cause main power stage 202 to produce an output voltage V0+ that is greater than or equal to the largest required output voltage Vo1+-Vo4+; and (3) configure each chopper controller 215 to operate a corresponding chopper switch 214 with a duty cycle that reduces the main power stage output voltage/chopper stage input voltage V0+ to the appropriate output voltage level Vo1+-Vo4+. Controller 220 may configure main power stage 202 to generate the required output voltage V0+ by determining/selecting the reference signal provided to feedback loop 204, as described in greater detail below with reference to FIG. 4. Similarly, controller 220 may configure each chopper stage to generate the required output voltage Vo1+-Vo4+ by altering the reference signal provided to the chopper controller feedback loop.

Figure 3:
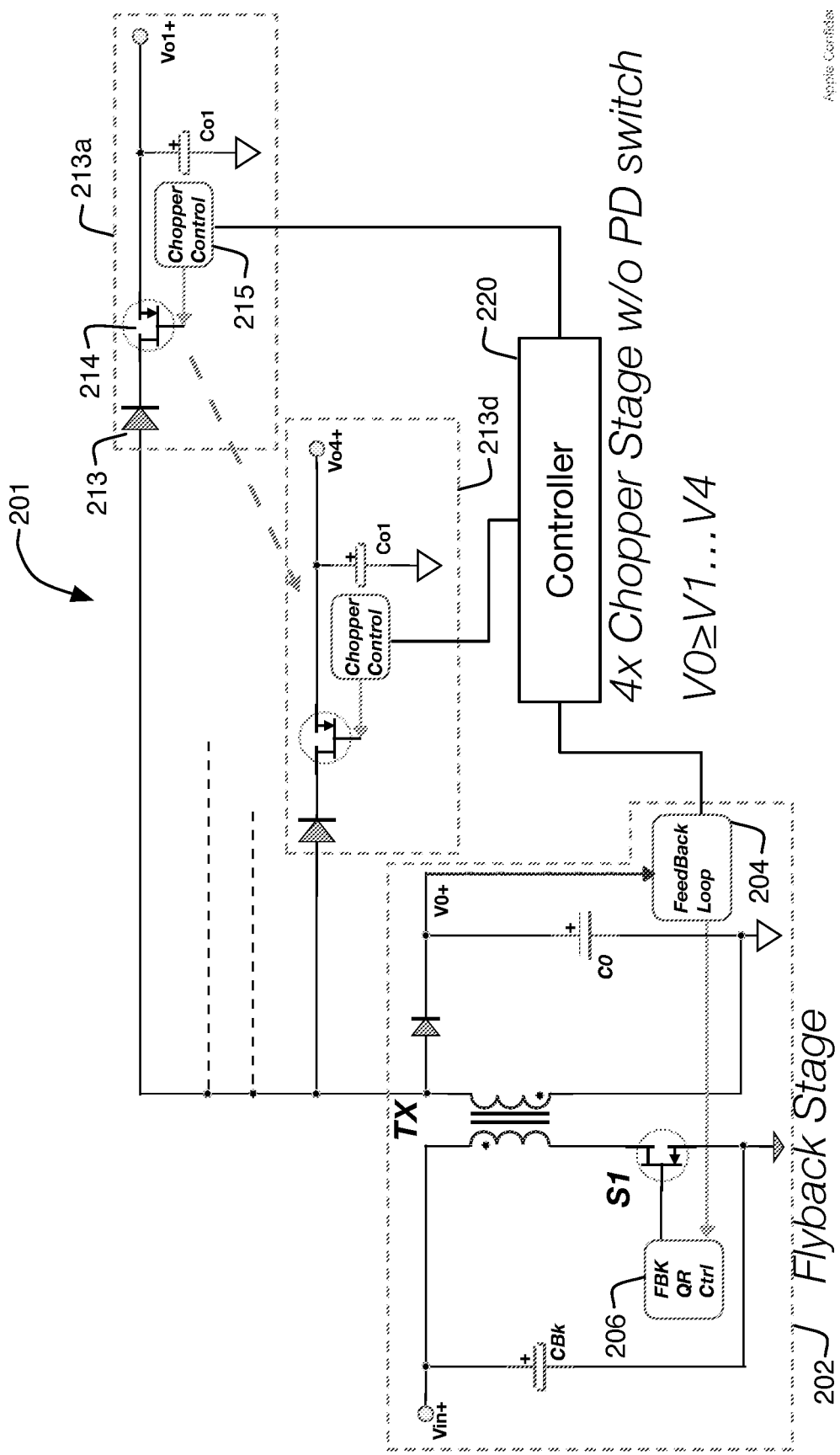
FIG. 3 illustrates an alternative multi-output adapter with a single power stage and chopper regulators for each output.

Additionally, adapter 200 may include, in the respective regulator stages 212a-212d, power delivery switches 218. These switches may be used to selectively disconnect/disable a respective output stage when its operation is not required or in the event of a fault. However, these power delivery switches 218 may be omitted, as illustrated in converter 201 of FIG. 3. Converter 201 is substantially similar to converter 200, except that regulator stages 213a-213d omit power delivery switches 218. In such configurations, chopper switches 214 may be used to disconnect/isolate an output as appropriate. Either of converters 200 or 201 can address the above-mentioned deficiencies of prior art multi-output adapters by providing for a reduced number of switches per output, i.e., as few as one switch per additional output in converter 201. As a result, each switch may be sized to allow for the full output power to be delivered to each output. In such cases, controller 220 (e.g., via control logic 221, discussed below) should be configured such that when power contracts are negotiated for the respective outputs, the total power capacity of the adapter is not exceeded. Suitable output current and/or power limiting may be provided to the respective regulator stages 202a-212d, for example, by providing suitable signals to chopper controllers 215.

Figure 4:
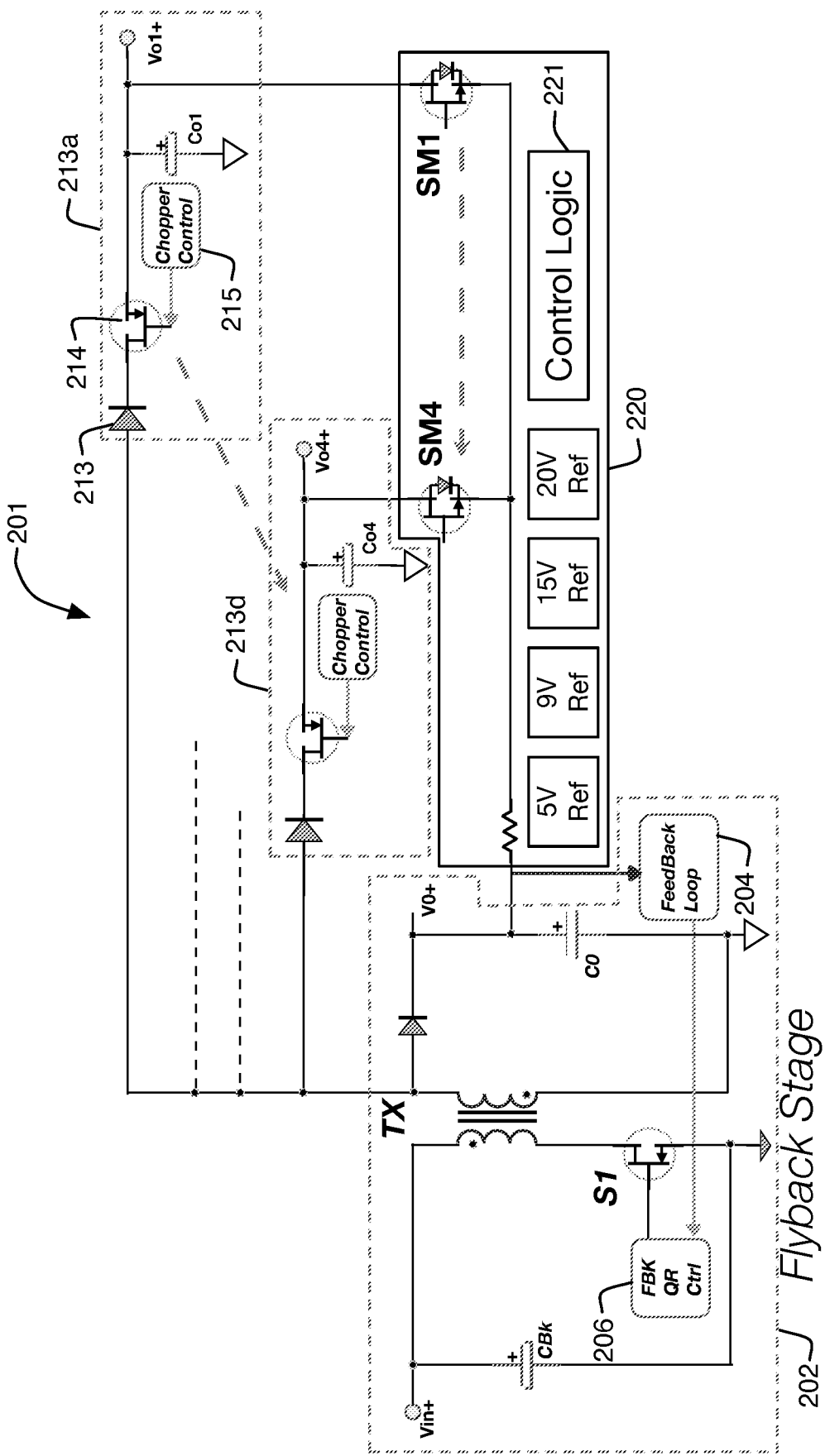
FIG. 4 illustrates further aspects of a multi-output adapter with a single power stage and chopper regulators for each output.

FIG. 4 further illustrates various aspects of adapter 201, particularly with respect to controller 220. Controller 220 may include internal control logic 221, which may operate as described above (and further below with reference to FIG. 6) to control main power stage 202 and chopper regulator stages 213a-213d to generate the respective output voltages Vo1+-Vo4+. Thus, control logic 221 may negotiate power contracts with the respective output loads, set the reference voltage for main power stage 202 feedback loop 204, and set the reference voltages for chopper controllers 215 (as well as selectively enabling/disabling chopper controllers 215, as appropriate). Because each of regulator stages 213a-213d is a chopper, it can only decrease the input voltage V0+ that it receives from main power stage 202. Thus, control logic 221 must be configured to, after negotiating the respective output power contracts, provide a reference voltage to main power stage 202's feedback loop 204 that corresponds to the highest negotiated voltage. Thus, controller 220 may include suitable circuitry for generating internal reference voltages corresponding to the available output levels (e.g., a 5V, 9V, 15V, and 20V) for USB-PD applications. Various reference voltage generation techniques are known, and thus are not repeated in detail here.

Also illustrated in FIG. 4 are feedback loop switches SM1-SM4, which may be part of controller 220. Feedback switches SM1-SM4 may be a silicon, silicon carbide, or gallium nitride MOSFET, or any other suitable semiconductor switching device appropriate to the particular application. Feedback switches SM1-SM4 may be operated by control logic 221 to provide a suitable voltage feedback signal to feedback loop 204 of main power stage 202. More specifically, control logic 221 may be configured to selectively energize the one of switches SM1-SM4 corresponding to the highest negotiated output voltage Vo1+-Vo4+. As a result, the highest output voltage will be provided as the feedback signal to main power stage 202's feedback loop 204, which will cause its output voltage V0+ to correspond to the highest output voltage required. Controller 220 can also provide the appropriate reference voltage to chopper controller stages 215, allowing them to reduce V0+ to a level suitable for their respective outputs. Additionally, switching of feedback switches SM1-SM4 could be omitted or delayed, as the intrinsic body diode of switches SM1-SM4 would allow for the highest output voltage of Vo1+-Vo4+ to be coupled to feedback loop 204. Similarly, feedback switches SM1-SM4 could be replaced with diodes, which would also allow for the highest output to be passed to feedback loop 204.

Additionally, one or more components of regulator stages 213a-213d could be incorporated into controller 220. For example, chopper control circuits 215 could be integrated with controller 220. Similarly, main stage feedback loop 204 and switch controller 206 could be integrated with controller 220. In some embodiments, the power switches themselves, including one or more of chopper switches 214, power delivery switches 218 (from FIG. 2), and main switch S1 could be integrated with controller 220 to form a single integrated circuit capable of implementing a multi-output power supply as described herein. Likewise, the various rectifier devices of main power stage 202 and regulator (chopper) stages 213a-213d could also be integrated into such a single integrated circuit. Although, as a practical matter, it may be desirable to integrate all of the various control circuitry into controller 220, while leaving the power stage switches and diodes separate, allowing for one integrated controller to be easily used to provide different converter power levels by coupling to power devices having suitable ratings and capacities.

Figure 5:
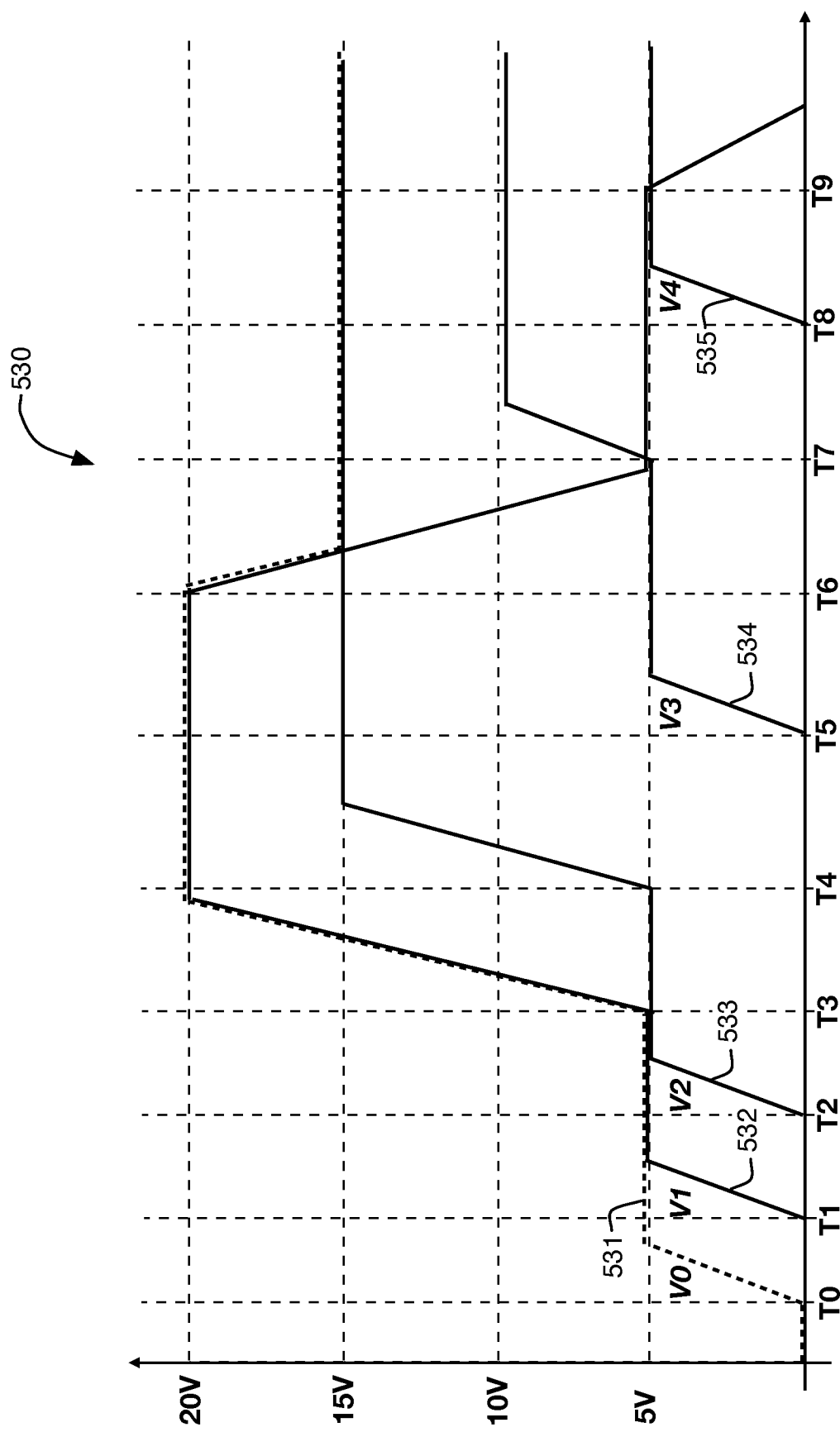
FIG. 5 illustrates exemplary voltage outputs of a multi-output adapter with a single power stage and chopper regulators for each output.

FIG. 5 illustrates voltage plots 530 corresponding to an exemplary operating sequence of a multi-output AC-DC adapter as described above. Prior to time T0, the converter may be off. At time T0, the converter may be turned on, for example by plugging in the adapter to an AC power source. Thus at time T0 controller 220 may begin operating main power stage 202 to generate an output voltage V0 (voltage trace 531) corresponding to a 5V level. As no loads are yet connected, this 5V level provides the bias level required for controller operation and basic switching functionality. At time T1, a first load may be connected to the first output. This first load may negotiate a 5V power delivery contract, meaning that voltage V1, trace 532, increases to 5V. Then, at time T2, a second load may be connected to the second output. This second load may also negotiate a 5V power delivery contract, meaning that voltage V1, trace 533, increases to 5V.

Then at time T3, the load connected to the first output may renegotiate to a higher voltage contract, e.g., 20V. This may be because the initially connected load now has an increased power requirement, or because a new load has been connected. In either case, both the main power stage output voltage V0 and first stage output V1 can correspondingly increase to 20V. Subsequently, at time T4, the load connected to the second output may renegotiate to a higher voltage contract, e.g., 15V. This may also be because the initially connected load now has an increased power requirement, or because a new load has been connected. In either case, because the new voltage level is still below the main power stage level, no change to the main power stage output voltage is required. Similarly, at time T5, a load may be connected to third output, initially negotiating a 5V contract for output voltage V3, plotted with curve 534. As above, because this negotiated level is below the current output voltage of main stage 202, no change to those voltage are required.

Subsequently, at time T6, the load connected to the first output may renegotiate its power contract to the 5V level. As a result, controller 220 can cause main power stage 202 to drop its output voltage level to the 15V level required by the load connected to the second output, which is now the highest output voltage. Then, at time T7, the third load may renegotiate to a higher voltage contract, e.g., 9V; however, because the main power stage is already providing 15V, no changes to its output are required. Similarly, at time T8, a fourth load may be connected to the fourth output, negotiating a 5V contract for V4, plotted by curve 535. Because the main power stage is already generating a 15V output, no further change is required.

Figure 6:
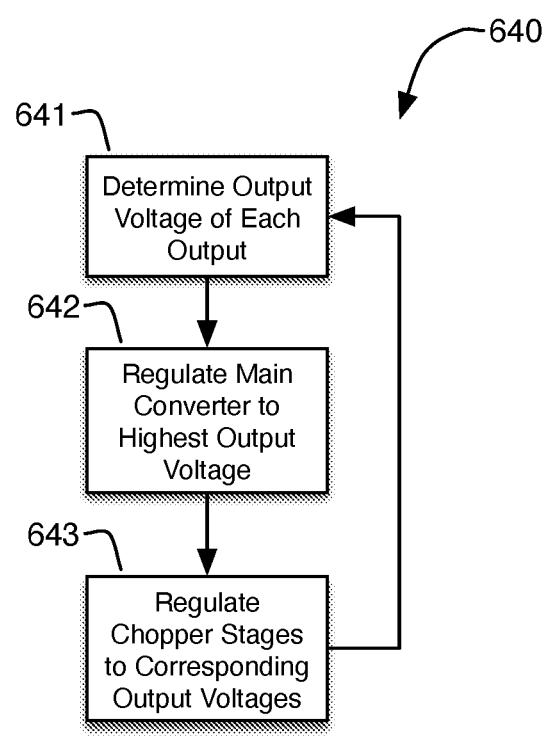
FIG. 6 illustrates controller operation of a multi-output adapter with a single power stage and chopper regulators for each output.

The above-described sequence is merely one example of a possible operating sequence meant to provide a concrete illustration of the application of the control logic. FIG. 6 illustrates a flowchart 640 that more generally describes the operating sequence employed by controller 220. Beginning at block 641, controller 220 can determine the output voltage of each 641. As one example, this may be determined by virtue of the USB-PD contract negotiation performed by controller 220. Then, in block 642, controller 220 can regulate the main power stage 202 to produce the highest output voltage of the respective stages. This can be performed as described above by providing suitable reference and feedback signals to the feedback loop 204 of main power stage 202. Also, in block 643, controller 220 can regulate the respective regulator (chopper) stages to corresponding output voltages. This can be performed as described above by providing suitable reference signals to the respective stages. If more than one output has the highest voltage, the controller may either parallel their outputs to the main power stage feedback loop 204 or can select either of them.

FIG. 7 illustrates a rectifier circuit 700 including an AC input 701 coupled to a rectifier 701. Rectifier 701 can produce an output voltage Vin+ that can be provided to the converter circuits described above with respect to FIGS. 1A, 1B, 2, 3, and 4.

The foregoing describes exemplary embodiments of multi-output AC/DC converters. Such systems may be used in a variety of applications but may be particularly advantageous when in conjunction with multiple personal electronic devices, such as notebook computers, tablet computers, smartphones, and various accessories, such as wireless earphones, styluses, and the like. Although numerous specific features and various embodiments have been described, it is to be understood that, unless otherwise noted as being mutually exclusive, the various features and embodiments may be combined in various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

Additionally, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A multi-output AC/DC adapter comprising:
   a main power stage configured to receive power from an AC power source and deliver an intermediate output voltage;
   a plurality of regulator stages, each regulator stage comprising a chopper circuit that receives the intermediate output voltage from the main power stage and produces a regulated output DC voltage for one of the multiple outputs of the multi-output AC/DC adapter; and
   a controller coupled to the main power stage and each of the plurality of regulator stages, wherein the controller provides a voltage reference signal and a feedback signal to a feedback loop of the main power stage and wherein the feedback signal provided to the feedback loop of the main power stage is an output voltage of one of the regulator stages.

2. The multi-output AC/DC adapter of claim 1 wherein the main power stage is a flyback converter, and the intermediate output voltage is derived from a secondary winding of a flyback transformer of the flyback converter.

3. The multi-output AC/DC adapter of claim 1, wherein each chopper circuit comprises a diode coupled to the intermediate output voltage of the main power stage, a chopper switch, and a chopper controller.

4. The multi-output AC/DC adapter of claim 3 wherein each chopper circuit further comprises a power delivery switch operable to selectively disconnect a corresponding output.

5. The multi-output AC/DC adapter of claim 1 wherein the controller provides a voltage reference signal to a controller of each of the regulator stages.

6. The multi-output AC/DC adapter of claim 1 wherein the controller is configured to negotiate a power delivery contract with one or more devices coupled to the multiple outputs of the multi-output AC/DC adapter.

7. A controller for a multi-output AC/DC converter, the converter comprising a main power stage and a plurality of chopper stages, each chopper stage corresponding to one of the multiple outputs of the multi-output AC/DC converter, wherein the controller comprises:
   first circuitry configured to negotiate a power delivery contract with one or more devices coupled to the multiple outputs of the multi-output AC/DC converter;
   second circuitry that determines a highest voltage from the negotiated power delivery contracts;
   third circuitry that provides a reference voltage corresponding to the highest voltage from the negotiated power delivery contracts to a feedback circuit of the main power stage; and
   fourth circuitry that provides a feedback voltage to the feedback circuit of the main power stage, the feedback voltage being an output of the chopper stage corresponding to the highest voltage from the negotiated power delivery contracts.

8. The controller of claim 7 wherein the power delivery contracts are negotiated in accordance with a Universal Serial Bus Power Delivery (USB-PD) standard.

9. The controller of claim 7 wherein the first circuitry configured to negotiate a power delivery contract with one or more devices coupled to the multiple outputs of the multi-output AC/DC converter comprises a programmable controller.

10. The controller of claim 7 wherein the second circuitry that determines a highest voltage from the negotiated power delivery contracts comprises a programmable controller.

11. The controller of claim 7 wherein the fourth circuitry that provides a feedback voltage to the feedback circuit of the main power stage, the feedback voltage being an output of the chopper stage corresponding to the highest voltage from the negotiated power delivery contracts comprises a switching device corresponding to each chopper stage.

12. The controller of claim 7 further comprising chopper control circuitry for each chopper stage.

13. The controller of claim 7 further comprising a feedback loop and control circuitry for the main power stage.

14. A method of controlling a multi-output AC/DC adapter comprising a main power converter and a plurality of chopper stages, each chopper stage corresponding to one of the multiple outputs of the multi-output AC/DC adapter, the method being performed by control circuitry of the multi-output AC/DC adapter and comprising:
   determining an output voltage of each of the multiple outputs of the multi-output AC/DC adapter;
   regulating the main power converter to produce a voltage corresponding to a highest output voltage of the determined output voltages;
   regulating each chopper stage to produce an output voltage corresponding to a respective output;
   providing a reference voltage to the main power convertor, the reference voltage corresponding to the highest output voltage; and providing a feedback voltage to the main power convertor, the feedback voltage being an output voltage of the chopper stage or stages having the highest output voltage.

15. The method of claim 14 wherein regulating each chopper stage to produce an output voltage corresponding to a respective output comprises providing a reference signal to a chopper controller of each chopper stage that corresponds to the output voltage of such stage.

16. The method of claim 14 wherein determining an output voltage of each of the multiple outputs of the multi-output AC/DC adapter comprises negotiating a power delivery contract with a load coupled to each respective output.

* * * * *